(12) United States Patent
Maucher et al.

(10) Patent No.: US 10,782,129 B2
(45) Date of Patent: Sep. 22, 2020

(54) METHOD AND SYSTEM FOR ASCERTAINING AND PROVIDING A GROUND PROFILE

(71) Applicant: Robert Bosch GmbH, Stuttgart (DE)

(72) Inventors: Dominik Maucher, Stuttgart (DE); Heinz Hertlein, Erlenbach (DE)

(73) Assignee: Robert Bosch GmbH, Stuttgart (DE)

( * ) Notice: Subject to any disclaimer, the term of this patent is extended or adjusted under 35 U.S.C. 154(b) by 83 days.

(21) Appl. No.: 16/209,483

(22) Filed: Dec. 4, 2018

(65) Prior Publication Data

US 2019/0170511 A1    Jun. 6, 2019

(30) Foreign Application Priority Data

Dec. 6, 2017  (DE) .......................... 10 2017 222 017

(51) Int. Cl.
*G01C 7/04* (2006.01)
*G01B 21/20* (2006.01)
(Continued)

(52) U.S. Cl.
CPC ............... *G01C 7/04* (2013.01); *G01B 21/20* (2013.01); *G01S 13/931* (2013.01);
(Continued)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/04; G01M 3/40; G01M 5/0091; G01M 7/02; G01M 99/00; G01M 99/002; B60W 2554/00; B60W 40/09; B60W 2040/0809; B60W 2040/0872; B60W 2540/22;
(Continued)

(56) References Cited

U.S. PATENT DOCUMENTS 5,610,330 A * 3/1997 Fricke ................... G01M 7/022
73/146
9,118,816 B2 * 8/2015 Stein ........................ H04N 7/18
(Continued)

FOREIGN PATENT DOCUMENTS

GB            1436740 A * 5/1976 ........... G01C 15/004

*Primary Examiner* — Andre J Allen
(74) *Attorney, Agent, or Firm* — Norton Rose Fulbright US LLP; Gerard Messina

(57) ABSTRACT

A method for ascertaining a ground profile in a region in front of a vehicle in a direction of travel, using at least one sensor; at least one vertical motion of at least one vehicle traveling ahead being measured by the vehicle, an independent motion of the vehicle being ascertained or estimated, the measured data of the at least one vertical motion of the at least one vehicle traveling ahead being compared to the ascertained or estimated data of the independent motion of the vehicle, and a ground profile being derived from the comparison of the measured data of the at least one vehicle traveling ahead with the ascertained or estimated data of the independent motion of the vehicle. In addition, a system is described.

9 Claims, 1 Drawing Sheet

(51) Int. Cl.
*G01S 13/931* (2020.01)
*G01S 17/931* (2020.01)
*G01S 17/66* (2006.01)
*G01S 13/72* (2006.01)
*B60W 40/06* (2012.01)
*G08G 1/16* (2006.01)

(52) U.S. Cl.
CPC ............ *G01S 17/931* (2020.01); *B60W 40/06* (2013.01); *B60W 2420/42* (2013.01); *B60W 2420/52* (2013.01); *B60W 2552/35* (2020.02); *G01S 13/723* (2013.01); *G01S 17/66* (2013.01); *G01S 2013/9323* (2020.01); *G01S 2013/93271* (2020.01); *G01S 2013/93273* (2020.01); *G08G 1/165* (2013.01)

(58) Field of Classification Search
CPC ........... B60W 2555/20; B60W 30/025; B60W 30/143; B60W 40/04; B60W 40/08; B60W 50/0098; B60W 60/00; B60W 10/06; B60W 2040/0881; B60W 2040/089; B60W 2050/0079; B60W 2050/0088; B60W 2050/0089; B60W 2050/143; B60W 2420/42; B60W 2540/01; B60W 2540/043; B60W 2540/045; B60W 2540/10; B60W 2540/221; B60W 2540/223; B60W 2540/227; B60W 2540/30; B60W 2552/00; B60W 2556/00; B60W 2556/65; B60W 2710/1044; B60W 2710/18; B60W 2720/10; B60W 30/00; B60W 30/02; B60W 30/0956; B60W 30/12; B60W 30/16; B60W 30/18163; B60W 40/06; B60W 50/00; B60W 50/0097; B60W 50/085; G01C 23/00; G01C 17/02; G01C 19/00; G01C 21/20; G01C 21/32; G01C 21/3415; G01C 21/3469; G01C 21/3602; G01C 21/3608; G01C 21/3617; G01C 21/3655; G01C 21/3667; G01C 21/3682; G01C 23/005; G01C 7/00
USPC .................................................. 73/146–146.8
See application file for complete search history.

(56) References Cited

U.S. PATENT DOCUMENTS

| | | | |
|---|---|---|---|
| 9,598,086 B2 * | 3/2017 | Heim | B60W 30/16 |
| 2012/0203428 A1 * | 8/2012 | Choi | B60G 17/08 |
| | | | 701/37 |
| 2016/0325753 A1 * | 11/2016 | Stein | G06K 9/46 |
| 2018/0194286 A1 * | 7/2018 | Stein | B60W 30/143 |
| 2018/0299554 A1 * | 10/2018 | Van Dyck | G01S 17/89 |
| 2019/0005667 A1 * | 1/2019 | Khawaja | G06T 7/12 |
| 2019/0079539 A1 * | 3/2019 | Sridhar | G05D 1/0278 |
| 2019/0347821 A1 * | 11/2019 | Stein | G05D 1/0246 |

* cited by examiner

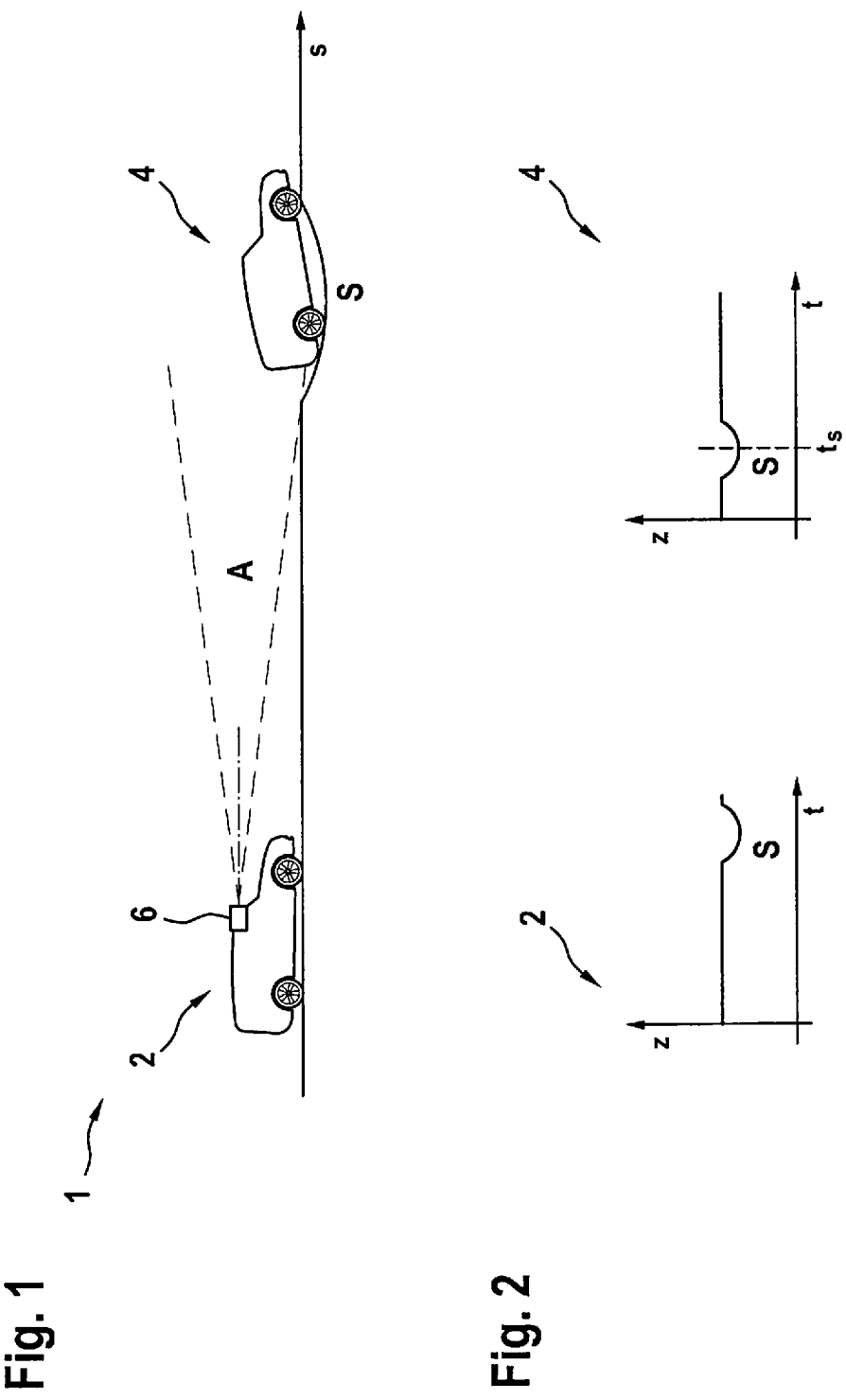

METHOD AND SYSTEM FOR ASCERTAINING AND PROVIDING A GROUND PROFILE

FIELD OF THE INVENTION

The present invention relates to a method for ascertaining a ground profile in a region in front of a vehicle in a direction of travel, using at least one sensor, as well as to a system for ascertaining a ground profile, including at least two vehicles.

BACKGROUND INFORMATION

Autonomous vehicles may travel on a route without a driver. In this context, the vehicle travels autonomously, for example, by independently detecting the course of the road, other road users or obstacles, and calculating the corresponding control commands in the vehicle and transmitting them to the actuators in the vehicle, whereby the path of travel of the vehicle is controlled correctly. Semiautonomous vehicles and driver assistance systems, which may assist the driver in particular driving situations, using supplementary electronic devices in vehicles, are already widespread. For example, using such autonomous or semiautonomous driving functions, vehicles traveling ahead may be detected, and the driver may be assisted in maintaining a safe distance.

However, directly ascertaining the ground profile in front of the vehicle, in order to be able to detect, for example, potholes or speed bumps, has been problematic for driver assistance systems and automated driving functions up to now. The sensors typically used for the autonomous or semiautonomous driving functions, such as radar sensors, lidar sensors and cameras, are normally not suitable for measuring the ground profile directly and with sufficient accuracy.

SUMMARY

An object of the present invention is to provide a precise method for measuring a ground profile, using a vehicle.

According to one aspect of the present invention, a method is provided for ascertaining a ground profile in a region in front of a vehicle in a direction of travel, using at least one sensor.

In one step, at least one vertical motion of at least one vehicle traveling ahead is measured by the vehicle. In this context, an independent motion of the measuring vehicle is also ascertained or estimated.

The measured data of the at least one vertical motion of the at least one vehicle traveling ahead are compared to the ascertained or estimated data of the independent motion of the measuring vehicle.

A ground profile is derived from the comparison of the measured data of the at least one vehicle traveling ahead with the ascertained or estimated data of the independent motion of the measuring vehicle.

Measurement data of the at least one sensor, which describe a motion of the at least one vehicle traveling ahead relative to the measuring vehicle, in the vertical direction, may be used for this. These measurement data may be described as a superposition of at least two signal sources. The first of the superimposed signal sources correlates with the desired ground profile at the specific position of the vehicle traveling ahead. The second superimposed signal source supplies interference signals, which correlate with the independent motion of the autonomous, non-autonomous or semiautonomous vehicle that measures with the aid of the at least one sensor. This may be, in particular, shocks and vibrations of the sensor or movements of the sensor due to the motion of the vehicle that measures with the aid of the at least one sensor; the shocks and vibrations of the sensor or movements of the sensor distorting the measurement data regarding the at least one vehicle traveling ahead. The method may be used by autonomous, semiautonomous and non-autonomous vehicles. For example, using at least one sensor, the ground profile may be determined for automatic emergency braking. In this instance, instead of influencing the autonomous or semiautonomous driving function, the method may also issue the driver a warning of driving over potholes at an excessive speed.

By ascertaining and/or estimating the independent motion of the vehicle, this interference factor may be extracted from the measurement data, so that precise measurement data regarding a vertical component of motion of the at least one vehicle traveling ahead may be ascertained. With the aid of measurement data corrected in this manner, an exact ground profile in a region in front of the measuring vehicle may be calculated.

With the aid of sensors typically present in driver assistance systems or systems for automated driving, in particular, sensors pointed in the direction of travel, the ground profile in front of the vehicle may be ascertained by the method of the present invention, in that measurements of the motion of vehicles traveling ahead are taken into consideration.

If autonomous or semiautonomous driving functions are activated, the ascertained ground profile may be used to adjust a speed or adjust a trajectory of the autonomous or semiautonomous vehicle. On the basis of the ascertained ground profile, the autonomous or semiautonomous vehicle may initiate an avoidance maneuver, for example, by changing a lane traveled in or reducing the cruising speed.

In addition, the ascertained ground profile may be taken into consideration for adjusting the speed limit. In particular, automatic traffic control systems may also receive the ascertained ground profiles and use them for appropriate traffic control. In this manner, road-traffic safety may be increased.

Furthermore, the ascertained ground profile may be used in the manual, that is, neither autonomous nor semiautonomous, driving mode of a vehicle provided with autonomous or semiautonomous functionality, or in a vehicle not provided with autonomous or semiautonomous functionality, in order to generate warnings to the driver of particular ground profiles.

According to one exemplary embodiment of the method, the independent motion of the at least one vehicle is ascertained, using at least one odometric measurement. For example, on the basis of acceleration sensors used in a vehicle, vertical motion models may be ascertained and utilized for correcting the measurement data. Consequently, the desired calculation or estimation of the ground profile is derived, by subtracting the interference signal in the form of the independent motion or natural vertical vibration, from the measured signal of the at least one vehicle traveling ahead.

According to a further exemplary embodiment of the method, the independent motion of the at least one vehicle is ascertained with the aid of an independent position estimation. Alternatively, or in addition, a ground profile already ascertained may be used for estimating the independent motion. In this connection, with the aid of the position of the measuring vehicle, a ground profile at this position may be retrieved, and consequently, the interfering influence on the sensor system may also be ascertained or estimated.

The measurements of the at least one vehicle traveling ahead may be used, for example, to update the ground profile. The ground profile already ascertained earlier may be stored, for example, in a storage unit inside the vehicle, or on a server unit outside of the vehicle.

According to a further exemplary embodiment of the method, the at least one vertical motion of the vehicle traveling ahead is measured by the vehicle in light of a change in elevation of an upper edge or of a license plate of the vehicle traveling ahead. In this manner, reference points of a vehicle traveling ahead may be defined, which are used for measuring the vertical motion of the at least one vehicle traveling ahead.

For example, an upper edge of the vehicle or a license plate of the at least one vehicle traveling ahead may be used as a reference point, as a function of a sensor used and a corresponding vertical scanning range. For example, a window edge or a roof edge of the vehicle traveling ahead may be used as a reference point. The feature that may be used is also a function of a distance from the at least one vehicle traveling ahead.

In the determination of the ground profile, vehicles traveling ahead or adjacent vehicles in other traffic lanes may also be analyzed, using sensors. In this context, for example, vertical deflections of tires in the case of a corresponding arrangement of vehicles in adjacent traffic lanes may be used as reference points for calculating the ground profile over a wide area.

According to a further exemplary embodiment of the method, the independent motion of the at least one vehicle is considered as an interference signal of the at least one measured vertical motion of the at least one vehicle traveling ahead. In this manner, a measuring error due to vertical vibrations of the sensor situated on the vehicle may be ascertained and used for correcting the measurement data of the at least one vehicle traveling ahead.

According to a further exemplary embodiment of the method, the at least one sensor is used for at least one autonomous or semiautonomous driving function. In this manner, the method of the present invention may be designed to be particularly inexpensive, since sensors are used, which are necessary for autonomous or semiautonomous driving functions and are already installed in the vehicle. Therefore, additional costs for further sensors or structural modifications of the autonomous or semiautonomous vehicle may be eliminated.

According to a further exemplary embodiment of the method, ground profiles already generated by other vehicles are retrieved by the at least one vehicle. In this manner, based on its position, which is ascertainable, for example, using a GPS signal, the vehicle may obtain a corresponding ground profile and, with the aid of the ground profile, estimate or calculate an influence of the ground profile on the measurement data of the at least one sensor. Preferably, the vehicle may use the corrected measurement data for updating the ground profile. This may be used, for example, in the case of repaired sections of road or recently damaged sections of road, and may contribute to increasing safety.

According to a further exemplary embodiment of the method, at least one ground profile generated by the at least one vehicle is loaded onto an external server unit and stored so as to be retrievable for other vehicles. In this manner, the calculated and corrected ground profile may be made available to other road users and pieces of traffic infrastructure.

In addition, comprehensive ground profiles from measurements of different vehicles may therefore be combined. In this manner, safety in the use of autonomous or semiautonomous driving functions may be increased. Furthermore, in the case of pavement damage, other road users may be warned early, using such up-to-date ground profiles, and the speed limits of the corresponding sections of the road may be adjusted.

According to a further exemplary embodiment of the method, the at least one sensor is a lidar device, a radar device or a camera. Such sensors are normally used for autonomous or semiautonomous driving functions and are suited for executing the method. In particular, individual sensors or a combination of the available sensors may be used or evaluated for increasing the accuracy of the measurement data. Alternatively, or in addition, the measurement data ascertained by the sensors may be transmitted to the external server unit; the respective correction of the measurement data and a derivation of a ground profile being able to be carried out by the more powerful, external server unit with the aid of complex algorithms.

According to a further aspect of the present invention, a system for ascertaining a ground profile is provided. The system includes an external server unit for storing and retrieving data of at least one vehicle. In addition, the system includes at least two vehicles; at least one vehicle being an autonomous or semiautonomous vehicle, which registers and measures at least one vehicle traveling ahead, using at least one sensor. According to the present invention, the at least one sensor is a sensor usable for an autonomous or semiautonomous driving function. The measured data regarding the at least one vehicle traveling ahead may be used for calculating a ground profile in a region situated in front of the autonomous or semiautonomous vehicle in the direction of travel; at least one independent vertical motion of the autonomous or semiautonomous vehicle being extractable for a calculation of the ground profile.

In this manner, the independent vertical motions of the measuring vehicles may be identified as error signals and removed from the measurements of the vehicles traveling ahead. For example, data of the acceleration sensors or position sensors used for odometry may be utilized for estimating the independent motion and the corresponding effect on the sensors used. The measurement data corrected in this manner and, in particular, the corrected measurement data of the vertical motions of vehicles traveling ahead, may be used for generating precise ground profiles. In this connection, the semiautonomous driving functions may be, for example, automated brake assist systems, lane departure warning systems, and the like.

BRIEF DESCRIPTION OF THE DRAWINGS

FIG. 1 shows a schematic representation of a system including two vehicles, according to one specific embodiment of the present invention.

FIG. 2 shows two schematic graphs of an ascertained ground profile at different measuring times, for illustrating the method according to one specific embodiment of the present invention.

DETAILED DESCRIPTION

FIG. 1 shows a schematic representation of a system 1 including two vehicles 2, 4, according to a specific embodiment of the present invention. In particular, the figure shows a 1-dimensional example, in which autonomous or semiautonomous vehicle 2 uses a sensor 6 for scanning a region A in front of vehicle 2 in the direction of travel. As an alternative, vehicle 2 may also be a non-autonomous vehicle 2, which has corresponding sensors 6 for scanning a region A in front of vehicle 2 in the direction of travel.

According to the exemplary embodiment, sensor 6 is a lidar device, which scans a vertical and horizontal region A, using a laser beam. Alternatively or additionally, sensor 6 may be a camera, a radar and the like. A multitude of measurement data is ascertained by sensor 6. In this context, vertical component z of vehicle traveling ahead 4 is extracted from the ascertained measurement data of sensor 6. In this connection, an upper edge of vehicle traveling ahead 4 is used as a reference point.

The ground profile includes a pothole S. According to the exemplary embodiment, vehicle traveling ahead 4 drives over pothole S, which means that a change in vertical component z is ascertainable.

FIG. 2 shows, at different measuring times t, two schematic graphs of an ascertained ground profile including pothole S from FIG. 1, in order to illustrate the method according to one specific embodiment of the present invention. Vertical component z at different times t is shown in the graphs; the diagram on the left illustrating the measurement of pothole S from the point of view of autonomous or semiautonomous vehicle 2, and the graph on the right illustrating the perception of pothole S by vehicle traveling ahead 4.

The time-dependent, vertical component of the measurement data z(t) of autonomous or semiautonomous vehicle 2 is described by superimposing vertical component Z4(t) of vehicle traveling ahead 4 and the independent motion Z2(t) of vehicle 2, that is, the vertical vibrations of sensor 6.

$$z(t)=f(Z2(t),Z4(t))$$

In this connection, the ground profile is already given from a concurrent measurement of an acceleration sensor of vehicle 2, which means that component Z2(t) may be ascertained and is therefore known. Thus, in this case, the ground profile B(t) sought after is determined from sensor signal z(t):

$$B(t)=f(z(t))$$

If earlier ground profiles have been generated, then an influence of the position-dependent ground profile on sensor 6 may be estimated or derived in light of the vehicle position of vehicle 2. In particular, if vehicle traveling ahead 4 has ascertained ground profile B(ts), this may be supplied to first vehicle 2, so that, for example, the position of pothole S is reached by vehicle 2 after a specific time. Consequently, vertical component Z2(t) of vehicle 2 may be ascertained, based on the following relation:

$$Z2(t)=z(B(ts))$$

Therefore, ground profile B(t) may be determined as follows:

$$B(t)=f(z(B(ts)),z(t))$$

What is claimed is:

1. A method for ascertaining a ground profile in a region in front of a first vehicle in a direction of travel, using at least one sensor, the method comprising:
   measuring at least one vertical motion of at least one second vehicle traveling ahead by the vehicle;
   one of ascertaining and estimating an independent motion of the first vehicle;
   comparing measured data of the at least one vertical motion of the at least one second vehicle traveling ahead to one of ascertained and estimated data of the independent motion of the first vehicle; and
   deriving a ground profile from the comparing of the measured data of the at least one second vehicle traveling ahead with the one of the ascertained and the estimated data of the independent motion of the first vehicle;
   wherein the at least one vertical motion of the at least one second vehicle traveling ahead is measured by the first vehicle in light of a change in elevation of one of an upper edge and a license plate of the second vehicle traveling ahead.

2. The method as recited in claim 1, wherein the independent motion of the first vehicle is ascertained using at least one odometric measurement.

3. The method as recited in claim 1, wherein the independent motion of the first vehicle is ascertained with the aid of an independent-position estimate.

4. The method as recited in claim 1, wherein the independent motion of the first vehicle is considered as an interference signal of the at least one measured vertical motion of the at least one second vehicle traveling ahead.

5. The method as recited in claim 1, wherein the at least one sensor is used for at least one of an autonomous driving function and a semiautonomous driving function.

6. The method as recited in claim 1, further comprising retrieving by the first vehicle other ground profiles generated by other vehicles.

7. The method as recited in claim 1, wherein the ground profile is generated by the at least one vehicle, the method further comprising:
   loading the ground profile onto an external server unit; and
   storing the ground profile so as to be retrievable for other vehicles.

8. The method as recited in claim 1, wherein the at least one sensor is one of a lidar device, a radar device, and a camera.

9. A system for ascertaining a ground profile, comprising:
   an external server unit for storing and retrieving data of at least one vehicle;
   a first vehicle that is one of a semiautonomous vehicle and an autonomous vehicle; and
   a second vehicle traveling ahead of the first vehicle, wherein:
      the first vehicle registers and measures at least the second vehicle traveling ahead using at least one sensor,
      the at least one sensor is usable for one of an autonomous driving function and a semiautonomous driving function,
      measured data regarding the second vehicle traveling ahead are usable for calculating a ground profile in a region situated in front of the first vehicle in a direction of travel, and
      at least one independent motion of the first vehicle is extractable for a calculation of the ground profile;
   wherein the at least one vertical motion of the at least one second vehicle traveling ahead is measured by the first vehicle in light of a change in elevation of one of an upper edge and a license plate of the second vehicle traveling ahead.

* * * * *